United States Patent [19]

Dowling

[11] Patent Number: 4,802,140
[45] Date of Patent: Jan. 31, 1989

[54] METHOD AND MOLDING SCREW FOR INJECTION MOLDING

[75] Inventor: Edward H. Dowling, Rochester, N.Y.

[73] Assignee: Eastman Kodak Company, Rochester, N.Y.

[21] Appl. No.: 43,779

[22] Filed: Apr. 29, 1987

[51] Int. Cl.⁴ .............................................. B29B 7/10
[52] U.S. Cl. ........................ 366/79; 366/144; 366/293; 425/204; 425/208
[58] Field of Search ............... 366/79, 81, 83, 144 X, 366/145, 146, 147–149, 293 X, 294, 295, 296; 425/204 X, 207, 208 X, 209, 587

[56] References Cited

U.S. PATENT DOCUMENTS

| | | | |
|---|---|---|---|
| 3,335,461 | 8/1967 | Schwartz | 425/587 |
| 3,359,601 | 12/1967 | Evans | 425/587 |
| 3,655,313 | 4/1972 | Kunogi | 425/587 |
| 3,689,182 | 9/1972 | Kovacs | 425/208 |
| 3,999,921 | 12/1976 | Thor et al. | 366/79 |
| 4,164,385 | 8/1979 | Finkensiep | 366/79 |
| 4,330,214 | 5/1982 | Willert | 366/78 |
| 4,387,997 | 6/1983 | Klein et al. | 366/79 |
| 4,501,498 | 2/1985 | McKelvey | 366/79 |
| 4,557,683 | 12/1985 | Meeker et al. | 425/209 |
| 4,637,790 | 1/1987 | Klein | 366/81 |

*Primary Examiner*—Philip R. Coe
*Assistant Examiner*—Corrine M. Reinckens
*Attorney, Agent, or Firm*—G. Herman Childress

[57] ABSTRACT

This invention relates to a method and molding screw for injection molding. The molding screw has a fixed inner screw mounted within a rotatable and reciprocally movable outer screw. The outer screw is continuously rotated throughout the injection cycle to (1) counter the back flow of melt material around the screw, (2) subject the melt material surrounding the inner screw to a vigorous mixing action, (3) add additional thrust to inject the melt material into the mold, and (4) return the outer screw to its initial starting position. A rod-type electrical heater is internally positioned in the fixed screw to maintain the temperature throughout the melt material surrounding the inner screw at a substantially constant value which is substantially equal to the barrel temperature.

8 Claims, 2 Drawing Sheets

METHOD AND MOLDING SCREW FOR INJECTION MOLDING

FIELD OF THE INVENTION

The present invention relates generally to molding, and more specifically to an improved method and molding screw for injection molding.

BACKGROUND OF THE INVENTION

Substantial advances in screw design technology have been made in the past 15 years. A variety of special mixing sections have been designed, for example, to replace part of the metering zone of a molding screw, especially for processing polyolefins. Screw designs are also available that handle a narrow range of materials; for example, low compression screws for handling mainly amorphous resins and high compression screws for handling crystalline materials, such as high density polyethylene. Also, barrier screws with two channels to separate solid melt are now available on the market, of which the Willert screw disclosed in U. S. Pat. No. 4,330,214 is exemplary. Yet, with all of the advances that have been made, the general purpose screw remains the most common equipment installed on most injection molding machines. The general purpose screw has a profile general enough to process several materials well, but none optimally. In todays manufacturing environment of just-in-time production schedules and quick-mold-change requirements, a strong need exists in the molding industry for a molding screw that will handle a large variety of materials efficiently and without compromising quality.

At present, two different screw designs, namely extruder and injection screw designs are utilized in the molding industry. U. S. Pat. No. 3,689,182, which issued to Kovac on Sept. 5, 1972, is exemplary of an extruder screw design. In this patent, the molding apparatus utilizes a screw type extruder for reducing a solid particulate plastic material to a melt material by maintaining a spiral solid body of continuous width material in continuous contact with a hot barrel of the extruder. The melt material is separated from the solid body as rapidly as formed by a barrier screw and conducted through radial passageways into a low pressure, axially extending, cavity within the extruder screw. The extruder screw extrudes the melt material under low pressure, and, in essence, is analogous to a sausage grinder in which the rotating screw transports chunks of meat through a cutter and die at low pressure.

The known injector screw design differs from the known extruder screw in that the melt material is subjected to a maximum pressure as high as 20,000 psi, for example, for forcing the melt material into an injection mold. This was achieved by modifying the outer screw so that it could be reciprocally moved within the barrel to function as a hydraulic ram for injecting a predetermined volume of the melt material into a mold. In this known injection screw design, the outer screw is normally nonrotatable during the injection stroke of the screw. This is so because rotation of the screw would cause a serious problem, namely the over-heating of the melt material in the passages between the periphery of the screw and the barrel causing degradation of the melt material resulting in an inferior product. Some of the earlier screw designs during the 1960's had the ability to rotate the screw during injection, but the screw design was discontinued because of the aforementioned over-heating problem. In an attempt to minimize this serious problem, the injection screw was normally provided with a non-return valve at the metering end of the screw. The non-return valve seals passages in the end of the screw during its movement in a forward direction to prevent the melt material from being forced back into the screw, by-passing the screw thread and overheating. However, the non-return valve presented an added serious and expensive maintenance problem because the parts of the non-return valve are subjected to extensive wear due to the action of the corrosive and abrasive melt material passing therethrough. Such wear of the non-return valve parts and between the non-return valve and barrel would result in a premature wear-out of the valve parts and an increase in barrel diameter necessitating frequent and costly replacement of the non-return valve parts and barrel.

The aforementioned serious problems presented by an extruder screw modified to function as an injector screw are obviated by the improved injector screw design of this invention which reliably and efficiently processes a large variety of plastic materials in both the injector and extruder modes of operation.

Accordingly, a purpose of the present invention is to provide an improved injector screw that will process a large variety of plastic materials efficiently and without compromising quality. The injection screw can also function superbly as an extruder screw merely by retaining the outer screw in its forward position.

SUMMARY OF THE INVENTION

It is an object of the present invention to provide an improved injection molding screw comprising:
  a fixed inner screw;
  a rotatable and reciprocally movable outer screw having a helical thread for feeding a solid plastic particulate material along the outer screw, the outer screw further enclosing the fixed inner screw to define a cavity between facing surfaces thereof for receiving melt material from the outer screw;
  a first heater encircling the outer screw for melting the solid plastic particulate material; and
  a second heater internally positioned within the inner screw for maintaining the temperature throughout the cavity within the melt material at a substantially constant value and substantially equal to the outer screw temperature.

Another object of the invention is to provide a method for improved injection molding with a molding screw having an outer screw that is rotatable and reciprocally movable within a barrel between a retracted position and a forward position, the outer screw having a helical thread defining a solid plastic particulate material feed channel, the outer screw further enclosing a fixed iner screw to define a cavity between facing surfaces thereof in fluid communciation with the feed channel for draining melt material from the feed channel, comprising the steps of:
  heating the barrel and inner screw;
  feeding a solid plastic particulate material into the feed channel of the outer screw while in its retracted position;
  rotating the outer screw in its retracted position to form a solid bed of particulate material along the full length of the feed channel, and to transform the particulate material into melt material which drains into the cavity to form a predetermined volume of melt material;

ramming the outer screw from its retracted position to its forward position while it is rotating for injecting the predetermined volume of melt material into a mold; and continuing to rotate the outer screw in its forward position causing thrust produced thereby to return the outer screw to its retracted position.

Other objects and advantages of the invention will become apparent from the following detailed description taken in connection with the accompanying drawings.

BRIEF DESCRIPTION OF THE DRAWINGS

In the detailed description of the invention presented below, reference is made to the accompanying drawings, in which.

DETAILED DESCRIPTION OF THE INVENTION

Figure 1:
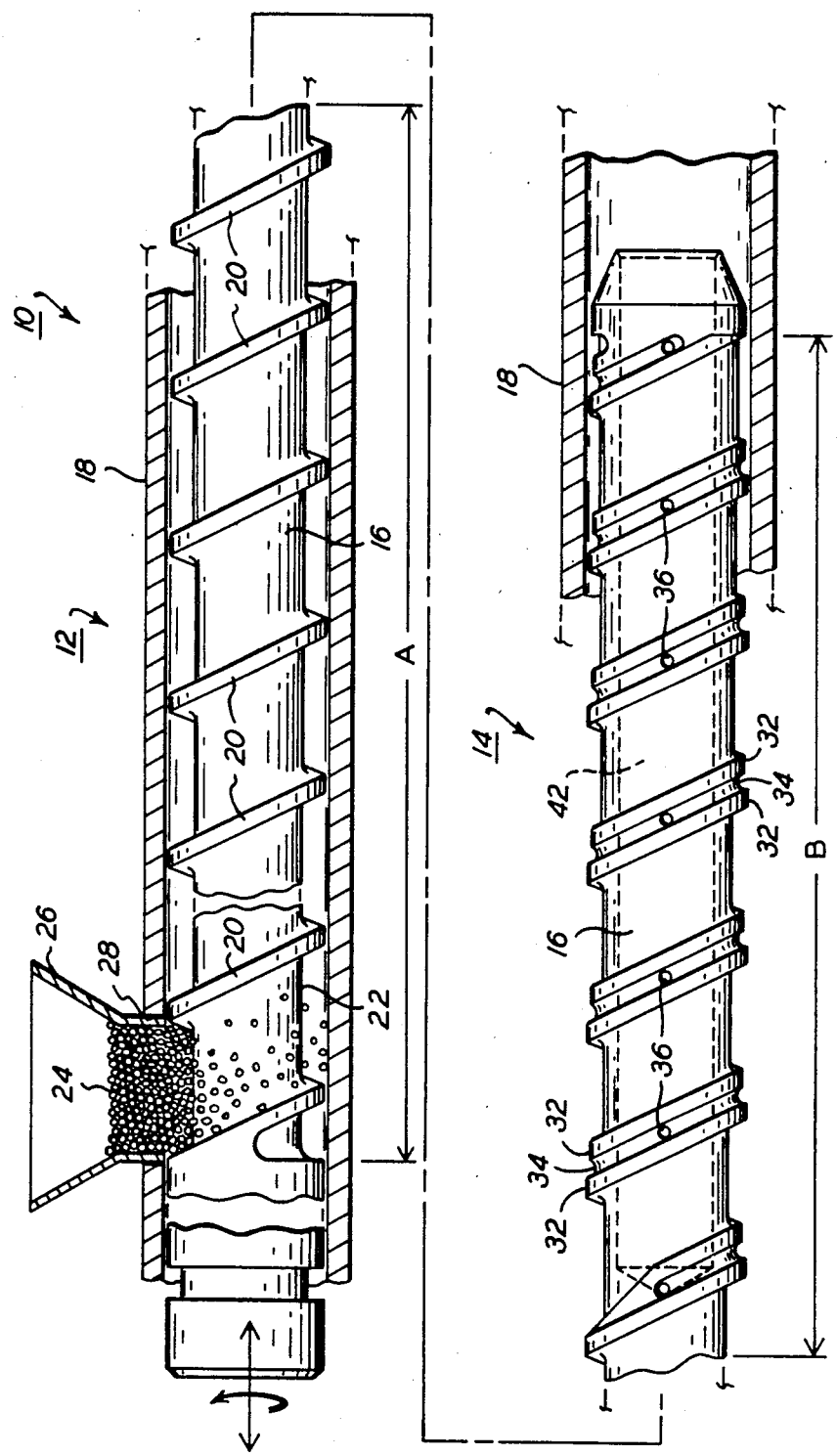
FIG. 1 is a front elevational view of the outer screw of a preferred embodiment of the injection screw of this invention with the enclosed inner screw shown by hidden lines, and further showing a segment of the barrel and feed section.

Referring now to FIG. 1 of the drawings, a preferred embodiment of the injection molding screw 10 of this invention comprises rear and front sections 12, 14 respectively of an outer screw 16 mounted within a known type of injection screw assembly, not shown, for rotation and reciprocal movement within a barrel 18. The injection screw assembly normally also includes a known standard drive transmission sub-assembly for imparting rotation to outer screw 16, and a known standard hydraulic thrust sub-assemlby for imparting reciprocal movement to outer screw 16 for injecting a predetermined volume of melt material from the injector screw into a mold. The injection screw assembly further has a known outer screw heating sub-assembly. Since the aforementioned sub-assemblies do not form a critical part of the present invention, only those portions thereof deemed critical to the present invention are shown.

The solid particulate plastic material feed section designated A of outer screw 16 has a feed thread 20 of a uniform substantially constant outer radius for operation within a portion of barrel 18 having a bore of uniform substantially constant diameter. The feed thread 20 has a substantially constant lead along the length of feed section A. The helical screw defines a feed channel 22 for receiving a solid particulate plastic material 24.

The barrel sub-assembly of the injection molding screw includes a feed hopper 26 from which the solid particulate plastic material 24 in the form of chips, pellets, powder or flakes is fed into feed channel 22 through an opening 28 in barrel 18. The solid particulate plastic material 24 may be continuously fed from hopper 26 to the screw where it is formed, upon rotation of the screw, into a solid spiral bed 30 which to some degree becomes softened by the heated barrel 18 as it reaches the melting section designated B of outer screw 16. Barrel 18 is heated by known electrical heating elements 19 mounted on the outer periphery of outer screw 16.

Figure 3:
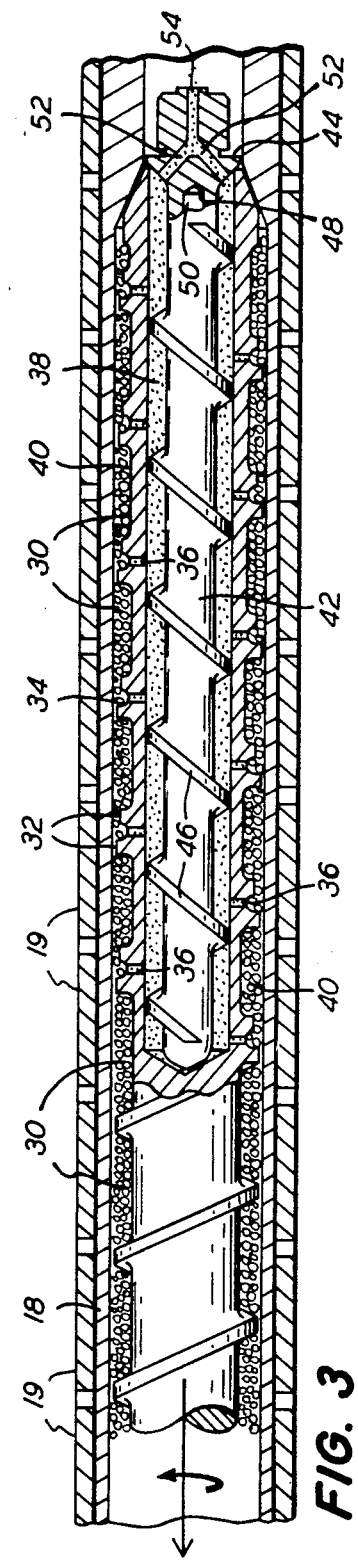
FIG. 3 is a segmental elevational view in section of the inner and outer screw assembly of the injection screw of this invention with the outer screw in its forward or holding position.
Figure 4:
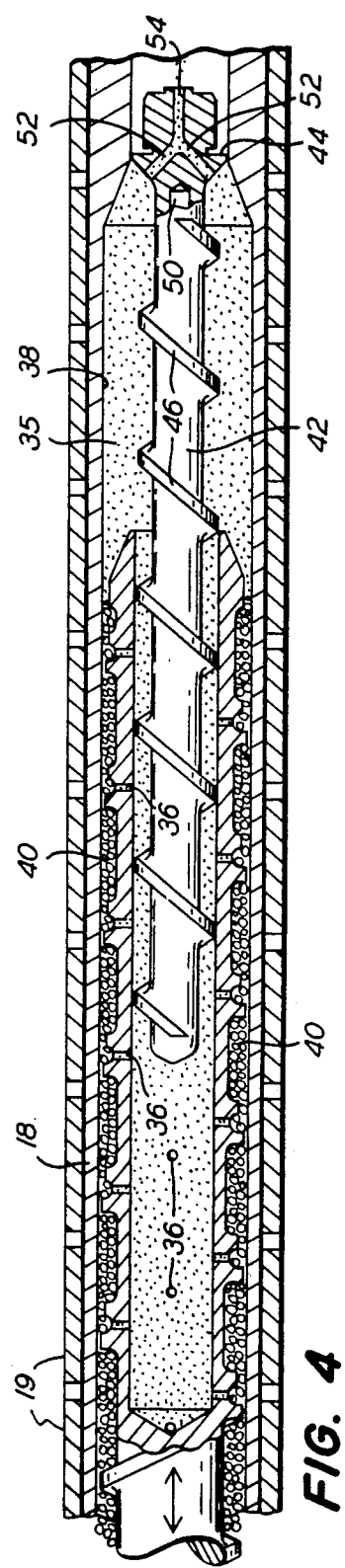
FIG. 4 is a view similar to FIG. 3 showing the outer screw in its retracted position following completion of an injection cycle.

The melting section B of outer screw 16 is slightly tapered from feed section A to the free end of the screw where the channels are dead ended, as best seen in FIGS. 3 and 4. The outer screw threads in melting section B comprise a known barrier screw section having a pair of closely spaced helical threads 32 defining a groove 34 between the threads. The groove is provided with angularly spaced radial openings 36 extending to a cylindrical hollow cavity 38 within outer screw 16. Plastic melt material 35 formed in the melting section B can drain through the openings 36 into hollow cavity 38. The channel space 40 between the pairs of barrier threads 32 forms a continuation of the feed channel 22 of section A within which is formed the solid spiral bed 30 of particulate material 24 along the full length of the feed channel 22.

Figure 2:
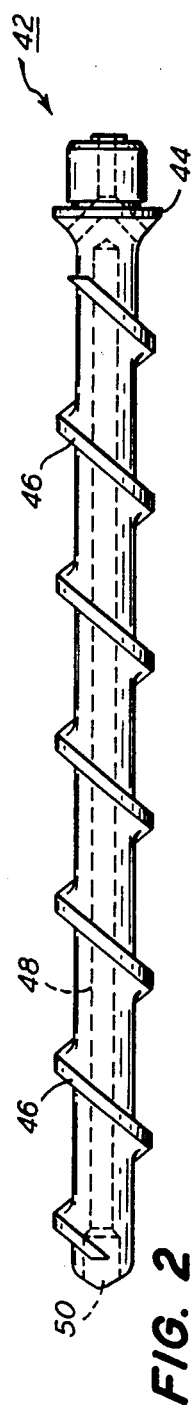
FIG. 2 is a front elevational view of the inner screw.

With reference to FIGS. 2–4, a cylindrical inner screw 42 is mounted centrally within cavity 38 with one end 44 thereof secured to the end cap of barrel 18. The inner screw 42 has a fixed helical left-hand thread 46 of a uniform, substantially constant outer radius. The inner screw 42 further has an axial blind bore 48 at its opposite end extending substantially across the entire length of the inner screw. A cylindrical electrical rod-type heater 50 is mounted within blind bore 48 for heating inner screw 42 and any melt material 35 within cavity 38. The inner screw 42 further has angular entry openings 52 extending from the outer surface of the screw to the axis thereof where the entry openings 52 merge with an axial outlet opening 54. The openings 52, 54 form a passageway through which the melt material 35 from cavity 38 can be forced into a mold during the forward injection stroke of the outer screw.

The injection operation is initiated with outer screw 16 in its retracted position, as seen in FIG. 4, by setting the screw into rotation within barrel 18 which is electrically heated by heaters 19 to a temperature capable of generating the heat required to melt the particular plastic to be injected. The continuous flow of the plastic in chip, pellet, powder or flake form is introduced from hopper 26 into the solid feed channel 22 of the screw. The plastic is picked up by feed thread 20 defining feed channel 22 and is forced forwardly within the barrel along the feed channel into channel space 40 of the melting section. As the plastic material is melted, it drains through radial openings 36 in the outer screw 16 into hollow cavity 38 and into engagement with the heated surface of inner screw 42. When a sufficient shot volume of melt material 35 has collected in the cavity, the outer screw 16 is rammed forwardly by the hydraulic sub-assembly to its forward position coincidently with the rotation of the outer screw for injecting the melt material 35 into the mold. Ramming outer screw 16 from its retracted position to its forward position also generates hydraulic forces between the inner and outer screws tending to separate facing surfaces thereof for preventing wear and galling there-between.

During the holding portion of the injection molding cycle which occurs in the forward position of outer screw 16, as seen in FIG. 3, just after the shot volume has entered the mold, the rotating screw 16 is allowed to move rearwardly to its starting position by the pressure increase of melt material 35 transmitted by the power of the screw rotation. During such screw rotation, the transported melt material entering melt cavity 38 replaces the displaced volume of the outer screw 16 as it retracts to the rear. This action is completed when the volume of melt material 35 is equal to or slightly greater than the shot volume necessary to fill the mold during the next cycle. At this point, the rotation of the outer screw 16 may be stopped in order to avoid a build up of pressure in barrel 18.

An important purpose of the present invention is to provide for the transmission of the high pressure forward thrust of the outer screw to the previously prepared volume of melt material 35 without a loss of pressure or by-passing of the melt material through internal screw passages. This is accomplished by rotating the outer screw 16 to maintain the solid bed 30 between threads 20, 32 immediately upon the start of the forward injection stroke of the outer screw, and continuing during the entire injection cycle. This rotation causes solid bed 30 between threads 20, 32 to function as a series of piston rings or packing glands on a cylinder for countering or preventing the melt material 35 from flowing back through the outer screw. The rotation further adds additional thrust to the shot volume of melt material 35 to expel it into the mold. The rotation is maintained during the entire injection cycle; however, such rotation can be stopped between injection cycles.

By rotating the outer screw 16 as it is reciprocated between forward and retracted positions, this invention has proved that unlike the known prior art, the improved injection screw can transmit the high thrust forces needed to expel the melt material 35 into a mold with high efficiency, resulting in faster injection and recovery times. Because of the higher thrust forces during forward motion of outer screw 16, the melt material 35 is subjected to a more vigorous mixing action around the fixed thread 46 of inner screw 42 than achieved by the known prior art, thus effecting better homogenity of the melt material.

Also, in this invention, rod-type electric heater 50 internally positioned in fixed inner screw 42 maintains better control of melt temperature, particularly during the cure portion of a molding operation; that is, during the time period between completion of the forward stroke of the outer screw 16 and initiation of the next forward stroke. This feature maintains the temperature throughout the melt material 35 surrounding the inner screw 42 at a substantially constant value and substantially equal to the barrel temperature. This minimizes the temperature difference at the beginning and the end of the injection stroke.

Some of the advantages of the improved injection screw of this invention are as follows:

1. Higher injection rates are maintained because the rotation of outer screw 16 during injection allows no appreciable back flow of melt material 35, and the increased forward thrust of outer screw 16 displaces more melt material into the mold in a shorter time period.

2. Lower energy is consumed per injection cycle because of the more efficient melting system as well as the aforementioned faster recovery times.

3. Superior melt temperature control is provided by the electrical heater 50 internally mounted in fixed inner screw member 42. The heater allows temperatures throughout the melt material 35 surrounding inner screw 42 to be maintained at a substantially constant value equal to the outer barrel 18 temperature.

4. Faster start-up from a cold inoperative condition achieved due to the internal heater 50 melting the interface melt material 35 surrounding inner screw 42.

5. Increased homogenity of melt material 35 discharged from the injection screw is achieved because of the improved mixing of the melt material caused by the action of fixed helical thread 46 of inner screw 42, and the higher thrust forces produced during the injection cycle caused by screw rotation. The higher surface temperture of fixed inner screw 42 produces less friction for melt material 35 and a higher velocity of the melt material for a more vigorous mixing action.

6. During the injection stroke of outer screw 16, the melt material 35 is forced to rotate around fixed inner screw 42 thus making intimate contact with the inner surface of outer screw 16 causing a washing action of the melt material 35. Also, a hydraulic balance of forces is achieved so that the facing surfaces of outer and inner screws 16, 42 respectively do not touch during operation, thereby preventing undue wearing or galling.

7. Plastic parts molded with the injection screw of this invention indicate higher values of impact strength and carbon dispersion, and higher output levels and efficiencies than other known screw designs.

8. Natural venting is achieved of unwanted gaseous and aqueous materials produced as the particulate material is transformed into melt material. The gaseous and aqueous materials are vented out through the solid bed of particulate material and feed hopper when the outer screw is non-rotating in its retracted position following completion of an injection cycle. During this non-rotating condition of the outer screw, the solid bed and melt material are under low pressure conditions allowing the gaseous and aqueous materials to escape.

The invention has been described in detail with particular reference to a preferred embodiment thereof, but it should be understood that variations and modifications can be effected within the spirit and scope of the invention.

What is claimed:

1. An injection molding screw comprising:
an elongate barrel having first and second end portions and having a bore extending along the length of the barrel, the barrel having at the first end portion thereof means for receiving sold plastic particulate material into the bore of the barrel,
a first screw positioned within the bore of the barrel and having a helical feed thread on the outer surface thereof defining a feed channel for the plastic material, the screw being rotatable relative to the barrel in a direction to advance particulate material along the barrel bore from the first end portion thereof toward the second end portion thereof, the screw being reciprocal within the barrel while it is being rotated between a forward position and a retracted position with the screw moving toward the first end portion of the barrel as it moves from its forward position to its retracted position and toward the second end portion of the barrel as it moves from its retracted position to its forward position, the screw having a cylindrical cavity therein, the cavity having an opening at the end thereof facing the second end portion of the barrel, and a plurality of drain openings through the screw providing fluid communication between the outer surface of the screw and the cavity,
a second screw positioned within the bore of the barrel and having a helical thread on the outer surface thereof, one end portion of the second screw being in engagement with the second end portion of the barrel and the other end portion of the second screw projecting into the cavity, the one end portion of the second screw having an outlet opening through which all of the melt of the particulate material can pass from the cavity through the opening and out of the barrel.

a first heater located with respect to the first screw to heat the particulate material between the first screw and the barrel to produce a melt that can pass through the drain openings in the first screw into the cavity, and a second heater located with respect to the second screw to heat the melt in the cavity to a temperature substantially equal to the temperature of the melt between the first screw and the barrel, whereby particulate material received at the first end portion of the barrel can be advanced toward the second end portion thereof by rotation of the first screw while the screw is in its retracted position with the first heater heating the material and producing a melt that can flow through the drain openings in the first screw into the cavity, and with the temperature of the melt in the cavity being maintained by the second heater until the first screw is reciprocated to its forward position while it continues to rotate and thereby drive melt from the cavity through the outlet opening in the second screw.

2. The screw as set forth in claim 1 wherein the portion of the first screw at the first end portion of the barrel comprises a feed section for the plastic material, the portion of the first screw at the second end portion of the barrel comprises a melting section, the melting section is tapered from the first end thereof at the feed section to the second end thereof with the feed channel being progressively smaller along the melting section and reaching a dead end at the second end of the melting section, thereby blocking melt in the feed channel and forcing it to flow through the drain openings into the cavity.

3. The screw as set forth in claim 2 wherein the feed thread in the melting section of the screw comprises a barrier screw having a pair of closely spaced helical threads defining a groove between the threads, and the drain openings in the screw extend from the groove into the cavity.

4. The screw as set forth in claim 1 wherein the feed channel reaches a dead end in the second end portion of the barrel to block the flow of melt through the second end portion of the barrel except through the outlet opening in the second screw.

5. A method for improved injection molding with a molding screw having an outer screw that is rotatable and reciprocally movable within a barrel between a retracted position and a forward position, the outer screw having a helical thread defining a solid plastic particulate material feed channel, the outer screw further enclosing a fixed inner screw to define a cavity between facing surfaces thereof in fluid communication with the feed channel for draining all of the melt material from the feed channel, comprising the steps of:

heating the barrel and inner screw;

feeding a solid plastic particulate material into the feed channel of the outer screw during reciprocal movement of the outer screw to and from its retracted position;

rotating the outer screw during reciprocal movement of the outer screw to and from its retracted position to form a solid bed of particulate material along the full length of the feed channel and to transform the particulate material into melt material which drains by way of the feed channel into the cavity to form a predetermined volume of melt material;

ramming the outer screw while it is rotating from its retracted position to its forward position for injecting the predetermined volume of melt material into a mold; and continuing to rotate the outer screw in its forward position causing a thrust produced thereby to return the outer screw to its retracted position.

6. A method for improved injection molding according to claim 5 comprising the further step of mixing and imparting a washing action to the predetermined volume of melt material during the ramming step.

7. A method for improved injection molding according to claim 5 comprising the further step of imparting hydraulic forces to the inner and outer screws during the ramming step for preventing wear contact between facing surfaces of the inner and outer screws.

8. A method for improved injection molding according to claim 5 comprising the further step of naturally venting unwanted gaseous and aqueous materials produced as the particulate material is transformed into melt material out through the solid bed of particulate material and the feed hopper when the outer screw is non-rotating in its retracted position following completion of an injection cycle.

* * * * *